United States Patent [19]

Horowitz

[11] 3,887,942

[45] June 3, 1975

[54] TAPE SPEED COMPENSATION SYSTEM

[75] Inventor: Noah Horowitz, Los Angeles, Calif.

[73] Assignee: Century Data Systems, Inc., A Division of California Computer Products, Inc., Anaheim, Calif.

[22] Filed: Apr. 13, 1972

[21] Appl. No.: 243,625

[52] U.S. Cl. .................................................... 360/51

[51] Int. Cl. ............................................... G11b 5/09

[58] Field of Search............. 340/174.1 A, 174.1 B, 174.1 H; 360/51

[56] References Cited

UNITED STATES PATENTS

| | | | |
|---|---|---|---|
| 3,488,452 | 1/1970 | Gunning et al | 340/174.1 B |
| 3,493,868 | 2/1970 | Hackett, Jr. | 340/174.1 H |
| 3,508,228 | 4/1970 | Bishop | 340/174.1 H |
| 3,560,947 | 2/1971 | Franchini | 340/174.1 H |
| 3,656,149 | 4/1972 | Srivastava et al. | 340/174.1 B |
| 3,689,903 | 9/1972 | Agrawala | 340/174.1 H |

*Primary Examiner*—Vincent P. Canney

[57] ABSTRACT

The margin of reliability of magnetically recorded data is sharply affected by speed variations of the moving media. A phase locked oscillator can be used to vary the initiation and termination of a window to bracket data information in accordance with tape speed changes.

5 Claims, 6 Drawing Figures

TAPE SPEED COMPENSATION SYSTEM

BACKGROUND OF THE INVENTION

Numerous techniques for recording digital information on magnetic tape have evolved in recent years. One method which provides high density recording is the phase encoded system. In one form of this system, a single track is utilized to provide both the data information and clock information — the latter being generated by circuitry which decodes the recorded information to produce a clock whose frequency varies in accordance with the speed of the tape. In prior art phase encoded systems however, the point at which the data transitions occurred would vary in relationship to the sampling window. In early systems, the sampling window was generated by a pair of one shots — the 1st having a time period of approximately three-fourths of the nominal time between successive data changes and the second one shot (which was triggered by the trailing edge of the 1st one shot) had a time period of one-half the nominal time between successive data changes. The output of the 2nd one shot was used as a sampling window to determine whether a data change occurred within its period. Such a system was marginal in that tape speed changes due to tape stretching, capstan variations etc., caused the data transitions to fall outside the window. Subsequent systems replaced the 1st one shot with a phase locked oscillator which generated an output whose time period varied in accordance with the frequency at which data was received (i.e., a tape speed). The period of the window however, was still constant (determined by the time of the 2nd one shot) so that tape speed changes adversely affected the reliability margins. What is actually desired is a data decoding system which would operate over a 10 percent tape speed variation without sacrificing data margins.

Accordingly, a primary object of the present invention is to provide a data decoding system for phase encoded information which will operate over a wide range of tape speed variations without imparing reliability.

A further object of the present invention is to provide an apparatus for varying the period of a sampling window in accordance with tape velocity changes.

Another object of the invention is to provide a system which will operate with different nominal tape speeds.

Another object of the invention is to provide a system for generating clock pulses from phase encoded data which are spaced to bracket the data pulses irrespective of tape speed variations.

Other objects and advantages of the present invention will be obvious from the detailed description of a preferred embodiment given herein below.

SUMMARY OF THE INVENTION

The aforementioned objects are realized by the present invention which comprises an amplifier connected to the input of the VCO which forms a part of the phase lock oscillator that tracks the frequency at which data is received from the tape. The output of the amplifier is used to vary the period of the one shot which determines the length of the window. The time at which the window opens is thus controlled by the phase locked oscillator and the same voltage which operates the VCO (in the phase locked oscillator) is used to alter the time at which the sampling window closes.

Figure 1:
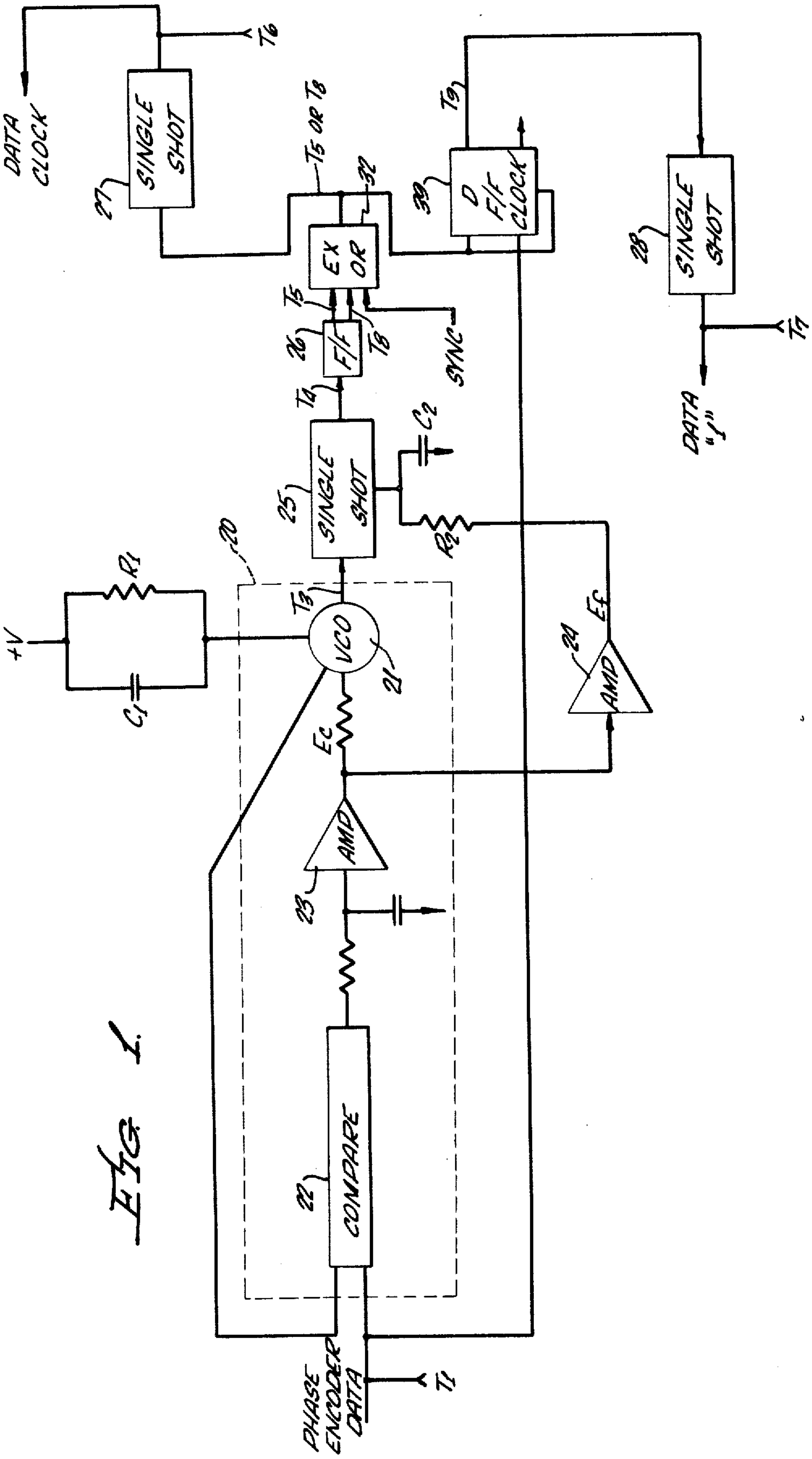
FIG. 1 shows in block diagram form the elements required to practice the invention.
Figure 2:
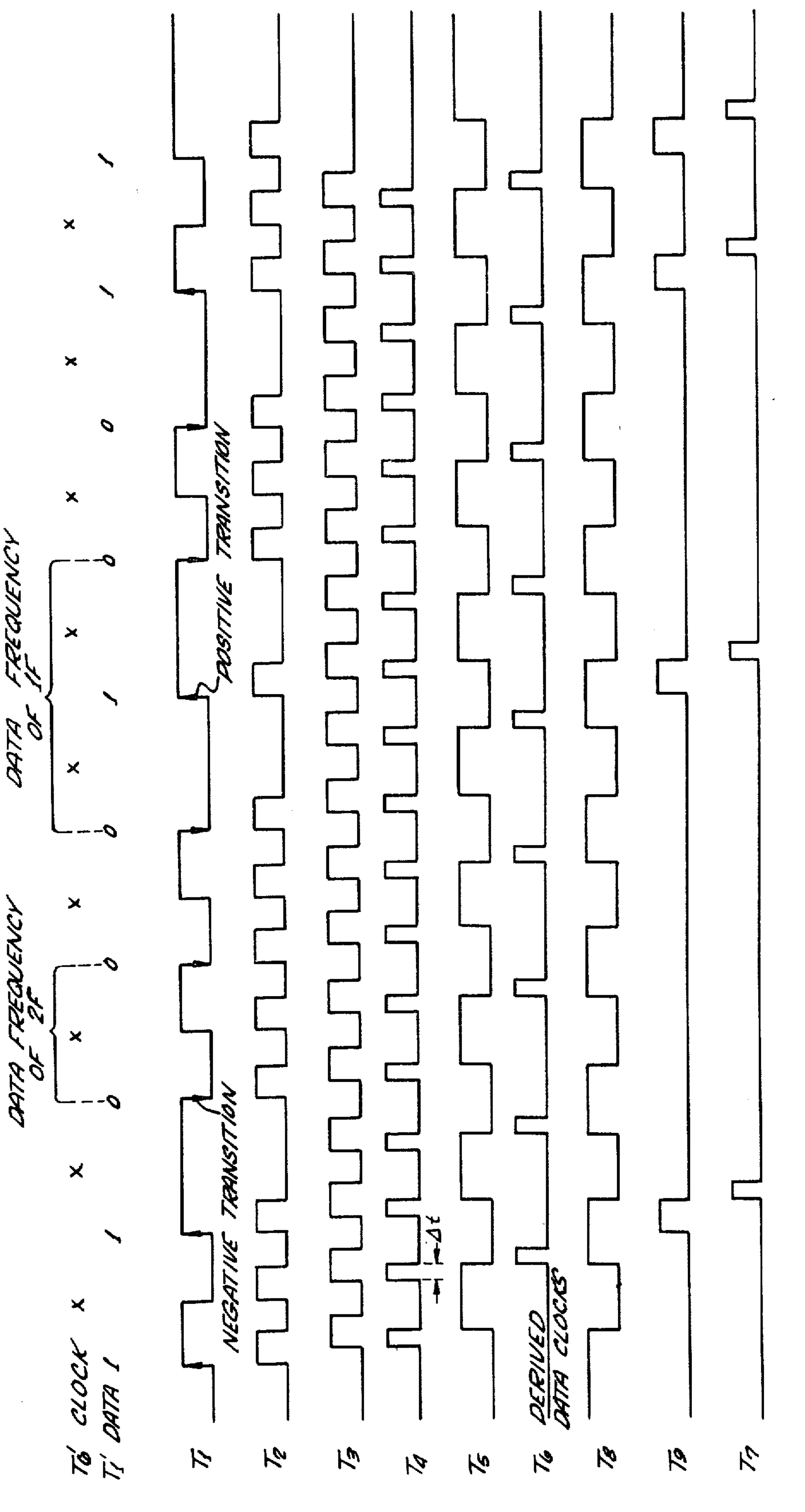
FIG. 2 shows the waveforms associated with the various elements shown in FIG. 1.

DESCRIPTION OF A PREFERRED EMBODIMENT:

Adverting to the drawings, and particularly FIGS. 1 and 2, a preferred embodiment of the invention comprises a phase lock oscillator circuit 20, which includes a Voltage Controlled Oscillator (VCO) 21 for generating a frequency which is equal to (or equal to a multiple of) the frequency of phase encoded data $T_1$ read from the tape. The two frequencies are compared by comparator 22 which generates an error voltage to correct the frequency of the VCO 21 (via amplifier 23) so as to track the changes in the frequency of the data $T_1$. The correcting voltage $E_c$ is also fed to amplifier 24 the output $E_c$ of which is used to vary the time period of the single shot multivibrator 25. The trailing edge of the output of this single shot 25 is used to trigger FLIP FLOP 26. Output $T_5$ of FLIP FLOP 26 is the sampling window by which the system determines whether or not a data transition has occurred. Single shot 27 generates the clock $T_6$ and the output of FLIP FLOP 28 is used to trigger the single shot 29 which generates the data pulses $T_7$.

Figure 6:
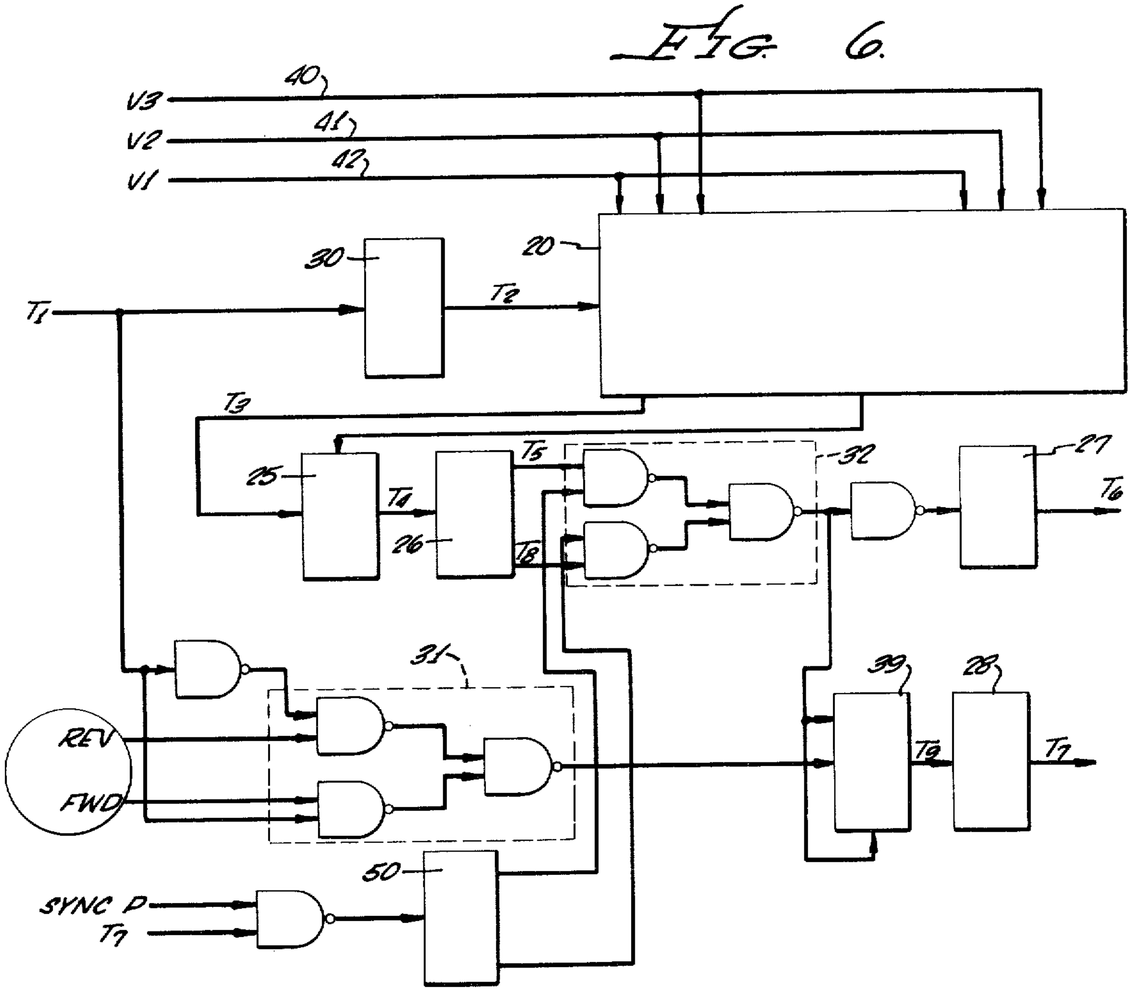
FIG. 6 is a complete block diagram illustrating the details of the forward-reverse reading system and the elements for effecting operating mode changes.

Having briefly described the essential elements of the invention, it is instructive to consider the basic concept of the phase encoding technique in order to fully appreciate the problems to which the present invention is directed. Referring now to FIGS. 2 and 6, it has been previously stated that the data from the tape appears typically as shown in $T_1$ after it has been read and amplified. A rising data transition signifies a binary one while a falling data transition signifies data zero. The data clocks $T_6$ are derived from the falling edge of the window $T_5$ by means of a single shot 27. Each pulse in the decoded data line $T_7$ represents a binary 1 bit. These pulse are synchronized with the leading edge of the window and therefore they appear between data clock pulses $T_6$. The separation of the data 1's from the data stream $T_1$ is accomplished by placing the data edges at the center of the window $T_8$. A rising data edge within the window sets the FLIP FLOP 39 and thus consequently generating the data bit 1 in $T_7$. In nominal conditions the data edge is centered within the window, however in operating conditions due to jitter, peak shifts, noise and tape speed, the data edge is moving within the window. Keeping the nominal setting of the data edge relative to the window, throughout the specified range, increases the data reliability. This nominal setting is continuously adjusted by controlling the current through the timing element $R_2$ of the delay single shot 25.

Figure 5:
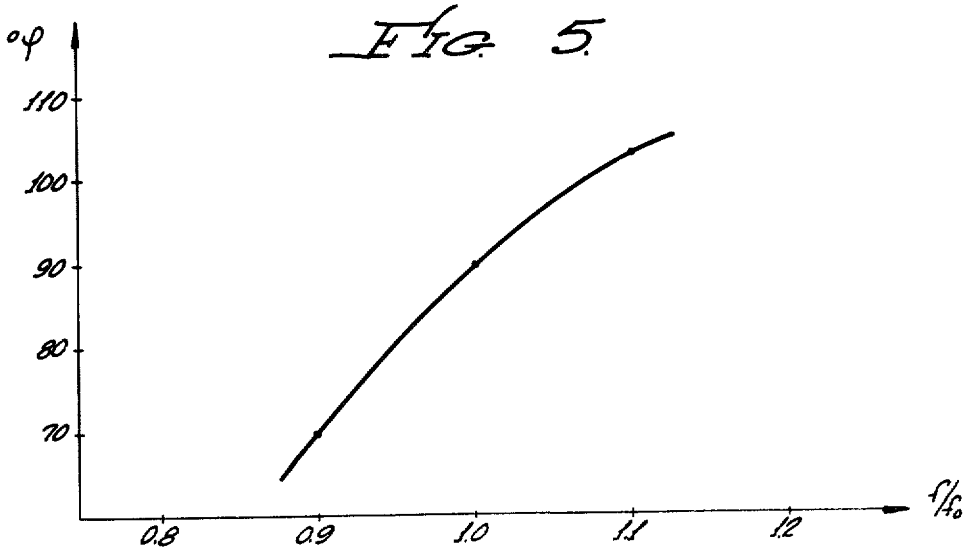
FIG. 5 shows how the phase changes between input data and output data as a function of input velocity changes (without compensation).

As shown in FIG. 5, if the elements which generate the various signals for decoding the data and deriving the clock are not somehow compensated for, changes in tape speed (which may be as large as 10 percent in a typical transport), will decrease the margin of reliability.

One shot 30 generates a pulse $T_2$ for each transition, whether negative or positive. These pulses are fed to the phase locked oscillator 20. The phase of the output of the VCO 21 (indicated as $T_3$) is nominally shifted by 90° with respect to $T_2$. The leading edge of $T_3$ is used to trigger the one shot multivibrator 25 to produce waveform $T_4$. The time ($\Delta t$) of one shot 25 is nominally such that the trailing edge of $T_4$ lies one-fourth between data transitions. This trailing edge is used to compliment FLIP FLOP 26 whose outputs are $T_5$ and $T_8$, both of which are fed to the exclusive OR circuit 32. The output of the exclusive OR (which corresponds to either $T_5$ or $T_8$) defines the sample window. Single shot 27 triggers on the trailing edge of $T_5$ (or $T_8$) to generate the clock pulses $T_6$. FLIP FLOP 39 is triggered to the ON state whenever a positive data transition occurs on $T_1$ while the window ($T_5$ or $T_8$) is open and reset by the trailing edge of $T_8$ (or $T_5$) to produce waveform $T_9$. Single shot 28 is triggered by the trailing edge of $T_9$ so as to generate binary ones $T_7$ which are nominally midway between the derived clock pulses $T_6$.

In summary, the logic produces a waveform $T_5$ (corresponding to the sample window) which brackets the data transitions equally. Transitions which occur within this window are identified as either positive going (a binary one) or negative going (a binary zero) and only those transitions which are positive going produce an output $T_7$. When an output on $T_7$ is produced, it will be midway between the derived clock pulses $T_6$.

If however, the incoming data varies in frequency, or if the VCO hunts so that $T_3$ is not exactly 90° out of phase with respect to $T_2$, an error voltage $E_c$ is generated. This voltage $E_c$ is fedback to correct the phase and vary it so as to maintain the sample window (and hence the data pulses and derived clock) in proper phase relationship. If however, a fixed delay ($\Delta t$) were used, the margins would be reduced when the incoming frequency varied. But by utilizing the phase error voltage $E_c$ within the phase locked oscillator 20 for automatically adjusting $\Delta t$ as the input frequency varies, the system is able to maintain optimum margins for the data pulses. In other words, because the length $\Delta t$ of $T_4$ is varied by $E_c$, the sample window remains fairly centered around the data edge in the phase encoded data stream.

Figure 4:
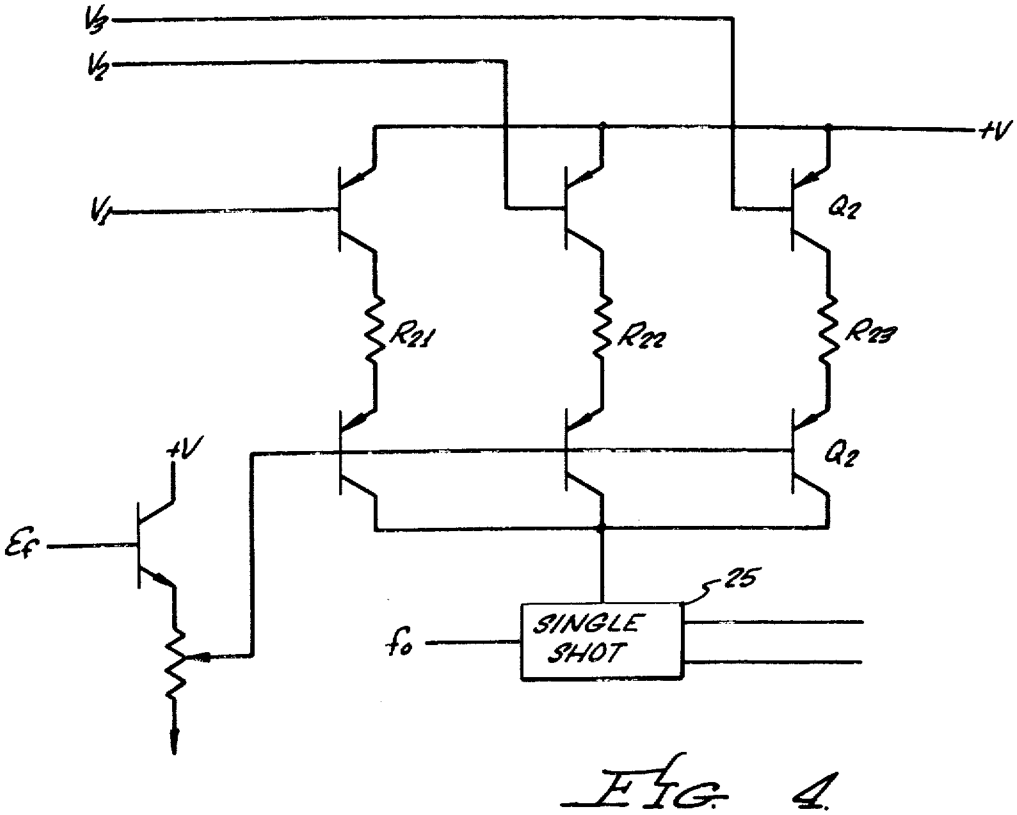
FIG. 4 shows the circuitry for automatically altering the time delay for different nominal tape speeds.

FIG. 4 shows the details of the circuitry used to control the time of single shot 25. In prior art systems, as previously mentioned, there was no way of continuously controlling the period of the one shot 25 — hence, even though the window opened on time, any speed variation would affect reliability by displacing the data transitions (time wise) relative to the center of the window.

The output of FLIP FLOP 26 is combined with a signal from the sync latch FLIP FLOP 50. In order to synchronize the system with the data track, the sync latch FLIP FLOP 50 operates to identify a string of ones or zeros which are recorded at the beginning of a data block (preamble). If the clock is at the wrong location — e.g., if the clocks $T_6$ occurred at the data edge rather than between data edges, FLIP FLOP 50 would make a transition that would shift the clock $T_6$ (via gate 32) to the proper position. The exclusive OR gate 31 is used to select the polarity of the data stream $T_1$ when the tape is to be read backwards, and thus provides additional system flexibility.

Figure 3:
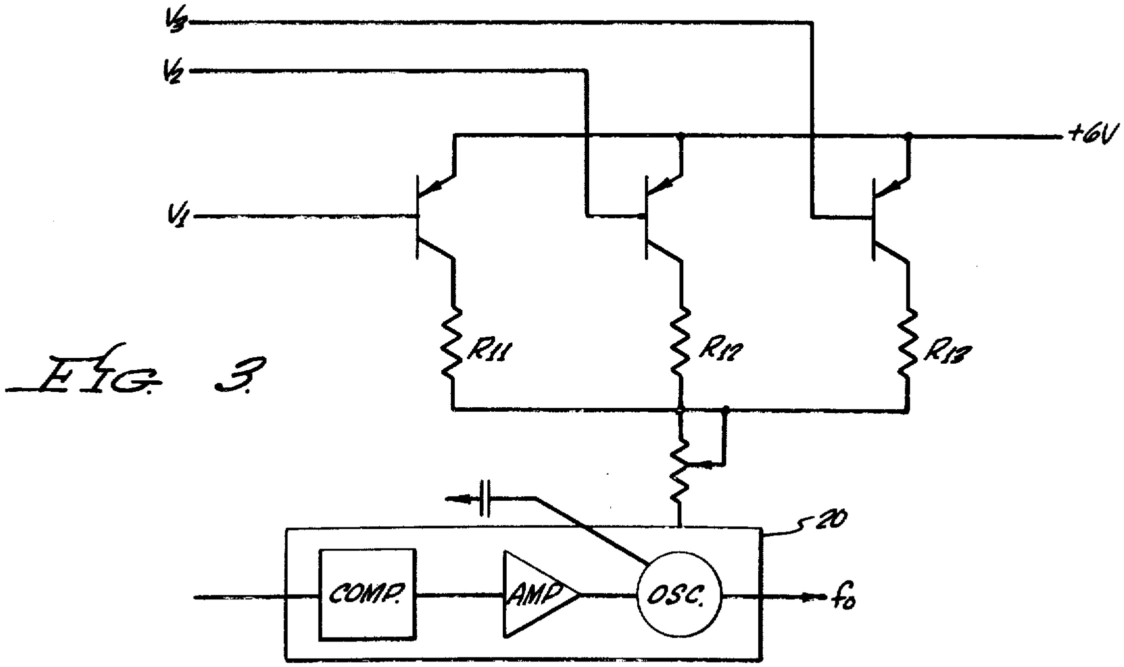
FIG. 3 shows the circuitry for automatically shifting the oscillator frequency to compensate for changes in the nominal frequency of tape speed.

The various inputs indicated as V1, V2, and V3 enable the system to operate with different nominal tape speeds. In a typical application the system can operate with data rates of 120, 200 and 320 kc, the frequency of the VCO being altered by applying a different bias voltage on one of the three lines 40–42. FIG. 3 shows the details of the PLO frequency selection. In a like manner, the same three voltages are applied to the single shot 25 (as shown in FIG. 4) so as to vary $\Delta t$ when the nominal data rate is changed.

The basic principle of the invention is not limited to tape systems — but it is equally applicable to magnetic disks, drums or any type of recording medium where variations in data rate are likely to occur. Nor is it limited to phase encoded recording schemes but rather to any self-clocking recording technique such as Manchester and FM codes. Nor is the invention restricted to the particular circuitry or logic shown — the blocks, logic and timing being exemplary only. Thus, although a preferred embodiment of the present invention has been shown and described, it will be understood that the invention is not limited thereto, and that numerous changes, modifications, and substitutions may be made without departing from the spirit of the invention.

I claim:

1. An apparatus for compensating for variations in the speed of a moving medium upon which digital data is recorded comprising:

means for varying the time position of the opening of a sample window as a function of the recording medium variations comprising a phased locked oscillator which generates a feedback voltage proportional to the instantaneous phase difference between the input frequency and the phase locked oscilator frequency;

means for varying the time position of the closing of the sample window as a function of recording medium speed variations comprising a one shot multivibrator having a width which is controlled by the feedback voltage generated by said phase locked oscillator;

means for centering the time position of the data edge between said opening and closing of the sample window and means for adjusting the opening and closing of the sample window so as to maintain the data edge centered with, respect to the opening and closing of the sample window as the speed of the recording medium varies.

2. The apparatus recited in claim 1 wherein is included logic means for deriving a clock pulse from the incoming data.

3. The apparatus recited in claim 2 wherein is included logic means for shifting the time position of the clock pulse in accordance with a recorded preamble.

4. The apparatus recited in claim 3 wherein is included logic means for decoding the recorded data irrespective of the direction which the recording medium is traveling.

5. The apparatus recited in claim 4 wherein is included:

means for adjusting said phase locked oscillator and said one shot so as to allow the system to operate with different nominal recording medium speeds.

* * * * *